April 28, 1942.
J. O'MALLEY
2,280,969
SHADE PULL ATTACHMENT
Filed Aug. 14, 1940
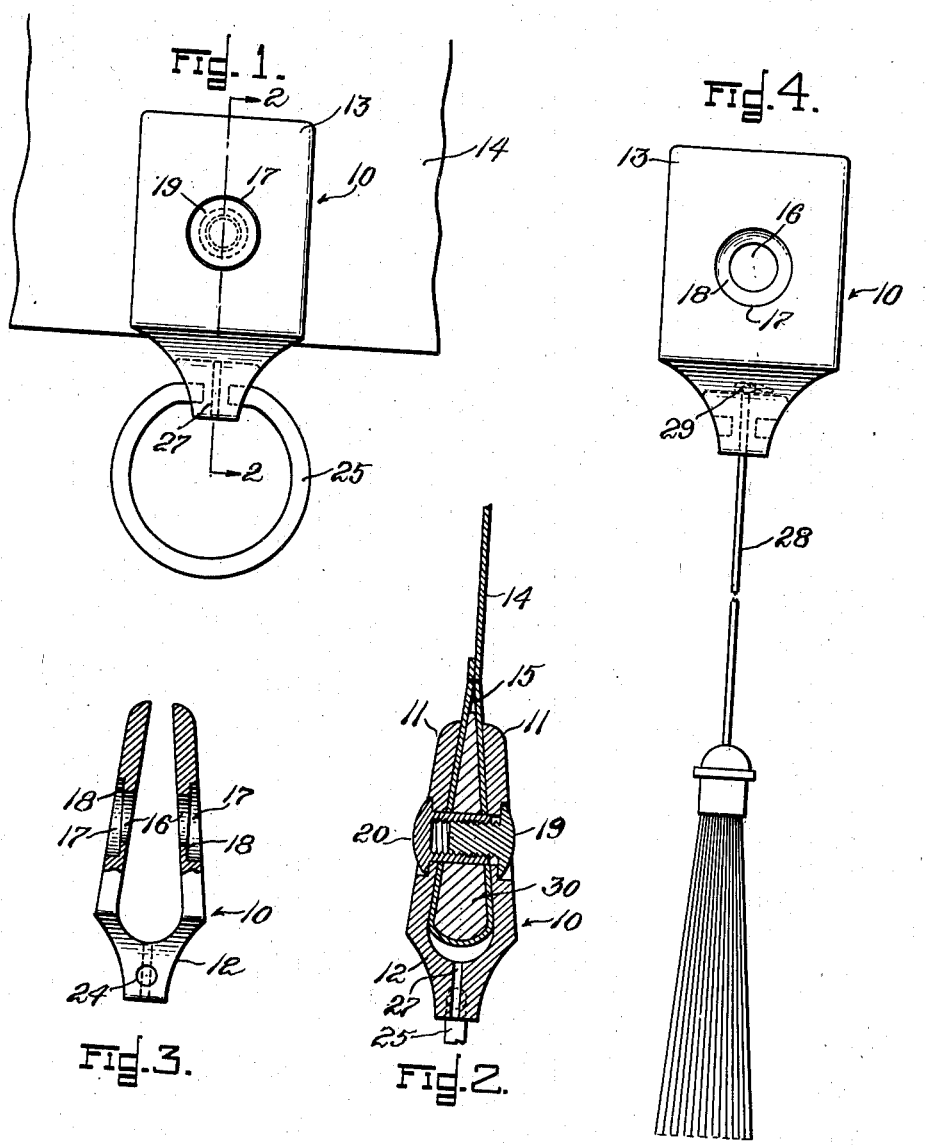
INVENTOR.
Joseph O'Malley
BY Arthur F. Randall Patented Apr. 28, 1942

2,280,969

UNITED STATES PATENT OFFICE 2,280,969

SHADE-PULL ATTACHMENT

Joseph O'Malley, New Bedford, Mass.

Application August 14, 1940, Serial No. 352,504

3 Claims. (Cl. 156—40)

This invention relates to a shade-pull attachment to be applied to the lower end of a window shade for use in operating the latter and the object of the invention is to provide an improved device of the character indicated which will be of simple, inexpensive and efficient construction.

To these ends I have provided a shade-pull attachment which may be constructed and operate substantially as set forth in the following description, the novel features of the invention being pointed out and defined in the claims at the close of the description.

In the accompanying drawing:

Figure 1 is an elevation of a portion of the lower end of a window shade equipped with a pull attachment constructed in accordance with this invention.

Figure 2 is a section on line 2—2 of Fig. 1.

Figure 3 is a side elevation, partly in section, of the body member of my new pull attachment.

Figure 4 illustrates the manner in which a pull-cord is connected with the attachment.

Figure 5 is a side elevation of the tubular nut hereinafter referred to, and

Figure 6 is a side elevation of the screw hereinafter referred to.

The illustrated embodiment of my invention comprises a body member 10 in the form of a fork or yoke which is preferably molded from a phenolic condensation product or other suitable plastic or moldable material.

This body member 10 comprises two spaced apart flat plate-like branches or tines 11, 11 joined at their lower ends by an intermediate bridge portion 12.

The two tines 11 fit flatwise against the opposite sides of the usual fabric covered wooden stick 30 of the fabric shade 14. As usual the lower marginal portion of shade 14 is hemmed to provide a transverse pocket 15 to receive the stick 30.

Near its middle each tine 11 is formed with a hole or aperture 16 whose outer end is formed with a countersink 17 the bottom of which latter provides an annular shoulder 18. The holes 16 of the two tines 11 are in axial alinement and one hole is occupied by a screw 19 and the other hole by a tubular nut 20.

After applying the attachment to the fabric covered stick 30 the tubular nut is inserted in one of the holes 16 so that its shank extends through suitable holes provided in the stick and its fabric cover, while the screw 19 is inserted within the other hole 16 and its threaded shank is screwed firmly into the tubular nut 20. Thus the body member 10 is securely fixed in position on the stick 30.

The sticks of window shades are commonly made of acutely triangular shape in cross-section and disposed with their thicker sides lowermost as shown in Fig. 2, and the present invention makes use of this feature to the extent that the tines 11 extend convergingly away from the intermediate portion 12 of the yoke 10 so as to fit flatwise against the opposite sides of the stick. Consequently, a single fastener 19—20 serves to clamp the tines immovably to the stick and the attachment is therefore held by the single fastener against pivotal displacement owing to the triangular shape of the stick and the converging disposition of the tines.

The screw 19 is made with a threaded shank 21 provided at its outer end with a head 22 which provides a radial flange to seat against the bottom of its countersink 17. The tubular nut 20 is interiorly threaded and likewise provided at its outer end with a head 23 which provides a radial flange to seat upon the bottom of its countersink 17.

Both heads 22 and 23 are made convex with thin peripheral edges which, as shown in Fig. 2, are completely housed within their countersinks so that the exterior of the attachment is devoid of projections to catch or snag lace curtains or the like, with which the shade may be associated, when the latter is raised and lowered.

The intermediate or bridge portion 12 of yoke 10 is made upon opposite sides thereof with sockets like that shown at 24 in Fig. 3 into which may be sprung the opposite ends of a split wire ring 25 as shown in Fig. 1. A hole 27 formed through the middle of the intermediate or bridge portion 12 is for the reception of one end of a tassel cord 28 which is threaded through said hole and knotted as at 29, Fig. 4.

The ring 25 is provided for use when the shade occupies a position within reach and the cord 28 for use when the shade occupies a high position where the ring 25 is out of reach. As will be clear, the ring and cord both serve as handle elements.

The subject matter of this application is divided from my co-pending application Serial No. 209,573, filed May 23, 1938, relating to shade-pulls which has developed into Patent No. 2,211,987 of August 22, 1940.

What I claim is:

1. A shade-pull comprising a molded yoke-shaped body whose tines are adapted to embrace and fit flatwise against the opposite sides of an apertured fabric-covered window shade stick, said tines being each formed with a hole extending therethrough having a countersink at its outer end and said two holes being axially alined relatively and also with respect to the aperture of said stick; an interiorly threaded tubular nut occupying one of said holes, said nut being made at its outer end with a head seated against the bottom of the countersink of its hole so that the periphery of said head is housed within said countersink, and a screw occupying the other hole with its shank in threaded engagement with said tubular nut, said screw being made at its outer end with a head seated against the bottom of the countersink of its hole so that the periphery of said head is housed within said countersink.

2. A shade-pull constructed in accordance with claim 1 and wherein the intermediate portion of said yoke-shaped body is made upon opposite sides thereof with sockets for the reception of the opposite ends of a split ring and is also made with a cord-receiving hole extending vertically through said intermediate portion between said sockets.

3. A shade-pull constructed in accordance with claim 1 and wherein said tines are joined by an intermediate portion of said body from which said tines extend convergingly so as to fit flatwise against the opposite sides of an apertured fabric-covered stick which is of acute triangular shape in cross-section and disposed with its thicker side lowermost.

JOSEPH O'MALLEY.